US011232353B2

(12) United States Patent
Arai

(10) Patent No.: US 11,232,353 B2
(45) Date of Patent: Jan. 25, 2022

(54) INFORMATION PROCESSING APPARATUS AND INFORMATION PROCESSING METHOD TO GENERATE IMAGE PROCESSING ALGORITHM BASED ON MACHINE LEARNING PROCESS

(71) Applicant: SONY CORPORATION, Tokyo (JP)

(72) Inventor: Hiroshi Arai, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/446,918

(22) Filed: Jun. 20, 2019

(65) Prior Publication Data

US 2019/0303793 A1 Oct. 3, 2019

Related U.S. Application Data

(63) Continuation of application No. 15/512,042, filed as application No. PCT/JP2015/003969 on Aug. 6, 2015, now Pat. No. 10,360,515.

(30) Foreign Application Priority Data

Sep. 30, 2014 (JP) .................................. 2014-199949

(51) Int. Cl.
| | |
|---|---|
| *G06N 3/08* | (2006.01) |
| *G06N 20/00* | (2019.01) |
| *G06T 13/80* | (2011.01) |
| *G06N 3/04* | (2006.01) |
| *G06K 9/62* | (2006.01) |
| *G06K 9/00* | (2006.01) |

(Continued)

(52) U.S. Cl.
CPC .................. *G06N 3/08* (2013.01); *G06K 9/00* (2013.01); *G06K 9/36* (2013.01); *G06K 9/6257* (2013.01);

(Continued)

(58) Field of Classification Search
CPC ...... G06N 99/005; G06N 99/00; G06T 13/80; G06T 7/00; G06T 2207/22084; G06K 9/36; H04N 7/0117
See application file for complete search history.

(56) References Cited

U.S. PATENT DOCUMENTS

| | | | |
|---|---|---|---|
| 7,167,583 B1 * | 1/2007 | Lipson | .................... G06T 7/001 |
| | | | 382/147 |
| 2005/0100208 A1 | 5/2005 | Suzuki et al. | |
| 2012/0207340 A1 * | 8/2012 | Bulan | ................. G01M 17/027 |
| | | | 382/100 |

FOREIGN PATENT DOCUMENTS

| | | |
|---|---|---|
| JP | 04-190461 A | 7/1992 |
| JP | 07-160796 A | 6/1995 |

(Continued)

OTHER PUBLICATIONS

Radford, Alec, Luke Metz, and Soumith Chintala. "Unsupervised representation learning with deep convolutional generative adversarial networks." arXiv preprint arXiv:1511.06434 (2015) (Year: 2015).*

(Continued)

*Primary Examiner* — Menatoallah Youssef
(74) *Attorney, Agent, or Firm* — Chip Law Group

(57) ABSTRACT

An information processing apparatus includes a control unit that creates a plurality of learning information items including an input image and a teacher image as an expected value by image-processing the input image in accordance with a scenario described with a program code, and supplies the created plurality of learning information items to a machine learning module that composes an image processing algorithm by machine learning.

6 Claims, 13 Drawing Sheets

(51) Int. Cl.
  *G06N 99/00* (2019.01)
  *G06T 7/00* (2017.01)
  *G06K 9/36* (2006.01)
  *H04N 7/01* (2006.01)

(52) U.S. Cl.
  CPC ......... *G06K 9/6262* (2013.01); *G06K 9/6274* (2013.01); *G06N 3/0454* (2013.01); *G06N 3/084* (2013.01); *G06N 3/086* (2013.01); *G06N 20/00* (2019.01); *G06N 99/00* (2013.01); *G06T 7/00* (2013.01); *G06T 13/80* (2013.01); *G06N 3/088* (2013.01); *G06T 2207/20084* (2013.01); *H04N 7/0117* (2013.01)

(56) References Cited

FOREIGN PATENT DOCUMENTS

| JP | 08-153194 A | 6/1996 |
| JP | 2006-337152 A | 12/2006 |
| JP | 2009-104275 A | 5/2009 |
| WO | 2014/087652 A1 | 6/2014 |

OTHER PUBLICATIONS

International Search Report and Written Opinion of PCT Application No. PCT/JP2015/003969, dated Oct. 13, 2015, 06 pages of English Translation and 06 pages of ISRWO.

International Preliminary Report on Patentability of PCT Application No. PCT/JP2015/003969, dated Apr. 13, 2017, 07 pages of English Translation and 03 pages of IPRP.

Non-Final Office Action for U.S. Appl. No. 15/512,042, dated Aug. 10, 2018, 11 pages.

Notice of Allowance for U.S. Appl. No. 15/512,042, dated Mar. 13, 2019, 09 pages.

\* cited by examiner

INFORMATION PROCESSING APPARATUS AND INFORMATION PROCESSING METHOD TO GENERATE IMAGE PROCESSING ALGORITHM BASED ON MACHINE LEARNING PROCESS

CROSS REFERENCE TO RELATED APPLICATIONS

The present application is a continuation application of U.S. patent application Ser. No. 15/512,042, filed Mar. 16, 2017, which is a National Stage of PCT/JP2015/003969, filed Aug. 6, 2015, and claims the benefit of priority from prior Japanese Patent Application JP 2014-199949, filed Sep. 30, 2014, the entire content of which is hereby incorporated by reference.

TECHNICAL FIELD

The present technology relates to an information processing apparatus, an information processing method and a program that an image processing algorithm is composed by machine learning in an image processing field.

BACKGROUND ART

When an algorithm is designed for image processing, a mathematical expression as a base of the algorithm mounted should be used. In contrast, in a machine learning module typified by a neural network, it is possible to compose the algorithm by determining an approximate equation of a target mathematical expression by the machine learning of input data and an expected value.

For example, Patent Literature 1 discloses a mechanism to construct automatically a feature amount calculation algorithm by which a target feature amount corresponding to input data such as an image is calculated using the machine learning and an genetic algorithm.

CITATION LIST

Patent Literature

Patent Literature 1: Japanese Patent Application Laid-open No. 2009-104275

DISCLOSURE OF INVENTION

Technical Problem

However, in the machine learning system, proper skill is often needed. For example, a necessary and sufficient learning pattern is provided by selecting the learning pattern and being familiar with basic characteristics of the machine learning. Therefore, it is difficult to compose efficiently the algorithm with good accuracy by utilizing the characteristics of the machine learning system. Otherwise, unsolved points remain in the machine learning system, and a solution is necessary.

In view of the above-described circumstances, an object of the present technology is to provide an information processing apparatus, an information processing method and an information processing system where a target algorithm can be composed using a machine learning system.

Solution to Problem

In order to solve the above-described problem, an information processing apparatus of a first embodiment according to the present technology includes a control unit that creates a plurality of learning information items including an input image and a teacher image as an expected value by image-processing the input image in accordance with a scenario described with a program code, and supplies the created plurality of learning information items to a machine learning module that composes an image processing algorithm by machine learning.

The control unit is configured to select a basic function that determines a machine learning algorithm of the machine learning module in accordance with configuration information created in advance.

The control unit is configured to supply a debug control signal that changes a behavior of the image processing algorithm to the machine learning module during the machine learning as input data.

The control unit is configured to select the debug function in accordance with the configuration.

In order to solve the above-described problem, an information processing method of a second embodiment according to the present technology includes, by a control unit, creating a plurality of learning information items including an input image and a teacher image as an expected value by image-processing the input image in accordance with a scenario described with a program code, and supplying the created plurality of learning information items to a machine learning module that composes an image processing algorithm by machine learning.

In order to solve the above-described problem, a program of a third embodiment according to the present technology is a program for making a computer function a control unit that creates a plurality of learning information items including an input image and a teacher image as an expected value by image-processing the input image in accordance with a scenario described with a program code, and supplies the created plurality of learning information items to a machine learning module that composes an image processing algorithm by machine learning.

Advantageous Effects of Invention

As described above, according to the present technology, a target algorithm can be satisfactory composed using the machine learning system.

It should be noted that the effect described here is not necessarily limitative and may be any effect described in the present disclosure.

BRIEF DESCRIPTION OF DRAWINGS

FIG. 13 is a diagram showing a configuration of a machine learning module where an empirical rule accumulation type function is plugged in.

MODE(S) FOR CARRYING OUT THE INVENTION

Hereinafter, an embodiment of the present disclosure will be described with reference to the drawings.

First Embodiment

Next, a design device of an image processing algorithm in a first embodiment according to the present technology will be described.

Figure 1:
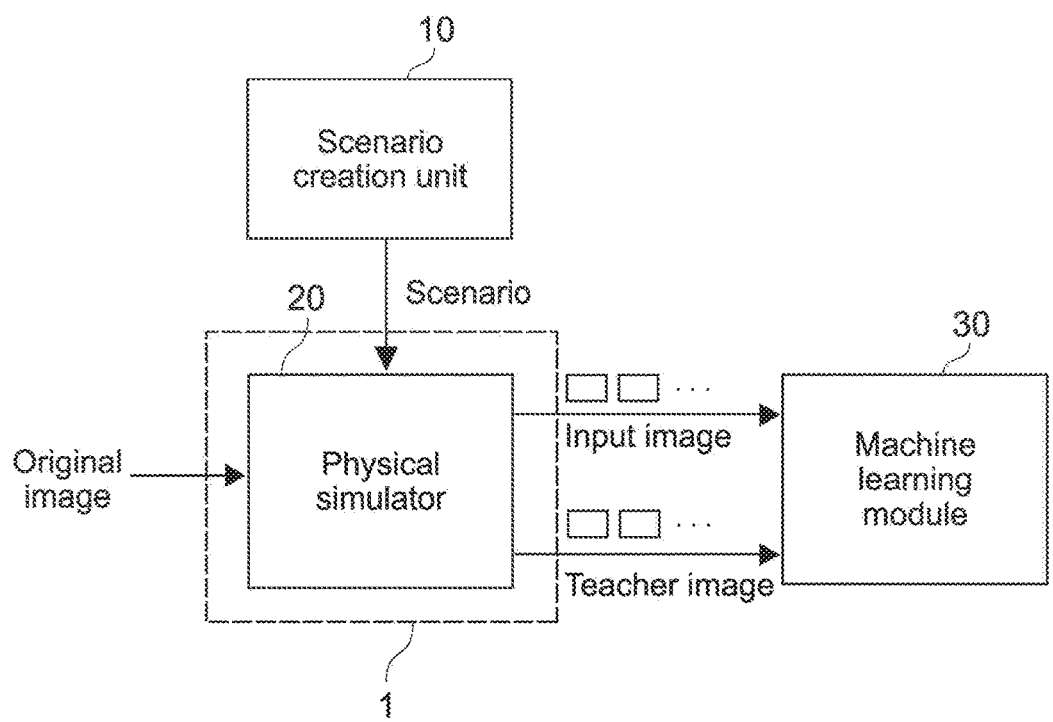
FIG. 1 is a diagram showing a configuration of a design device of an image processing algorithm in a first embodiment according to the present technology.

FIG. 1 is a diagram showing a configuration of the design device of the image processing algorithm in the first embodiment according to the present technology.

As shown in the same drawing, a design device 100 of the image processing algorithm includes a scenario creation unit 10, a physical simulator 20 and a machine learning module 30.

[Description 1 of Machine Learning Module 30]

The machine learning module 30 performs machine learning from an input image and an image (teacher image) as an expected value by image-processing the input image, and determines an approximate equation of a target mathematical expression to compose an algorithm for the image processing. An illustrated technique for the machine learning is, for example, a neural network, but the present technology is not limited thereto. Specifically, the machine learning module 30 includes, for example, one or more information processing apparatuses such as a PC (Personal Computer).

[Description of Scenario Creation Unit 10]

The scenario creation unit 10 supports a work of a scenario creator. The scenario is created with a program code by a high-level language where a learning information item including a pair of an input image and a teacher image supplied to the machine learning module 30 for the machine learning is created from an original image. The scenario creation unit 10 includes, for example, one or more information processing apparatuses such as a PC (Personal Computer).

Here, the scenario will be described.

In general, in order to compose the algorithm having high precision by the machine learning, it is necessary that the learning information items are supplied to the machine learning module 30 as many as possible to repeat the machine learning. However, it is actually difficult to prepare artificially a number of learning information items on the basis of images. With the machine learning by the learning information items whose number is limited that are prepared artificially, the algorithm with high precision is composed with difficulty.

According to this embodiment, a large amount of the learning information items having different conditions can be created from the original images at a high speed in accordance with the scenario described with the program code by the high-level language. For example, variables such as a speed of an image (video), acceleration, an exposure time (frame rate) can be described in the program code. While these variables are incremented, the program code may be described so as to repeat arithmetic processing for creating the learning information items through a loop such as a "for sentence".

[Description of Physical Simulator 20]

The physical simulator 20 processes a variety of images (original images) such as abstract pattern images prepared for learning in accordance with the scenario created by the scenario creation unit 10, and acquires the result as the input image and teacher image. The physical simulator 20 supplies a pair of the input image and teacher image as the learning information item to the machine learning module 30.

The physical simulator 20 processes the original image in accordance with the scenario, whereby a number of different input images and teacher images are created for one original image. Furthermore, the physical simulator 20 creates a number of different input images and teacher images for a plurality of original images in accordance with the scenario, whereby an enormous kinds of learning information items can be acquired from a limited number of original images.

The physical simulator 20 is specifically configured of one or more information processing apparatuses such as a PC or the control unit 1 such as a CPU (Central Processing Unit). Also, the physical simulator 20 is configured such that a program stored in a memory is executed by the CPU. The control unit 1 may include the scenario creation unit 10. Alternatively, the control unit 1 may include the machine learning module 30.

[Description 2 of Machine Learning Module 30]

The machine learning module 30 extracts randomly, for example, at least a part of learning information items from the enormous kinds of learning information items created by the physical simulator 20, performs the machine learning using the extracted learning information items, and creates a target image processing algorithm. The machine learning module 30 repeats the machine learning using a number of learning information items. Thus, in the machine learning module 30, comprehensive learning will be done, and an image processing algorithm with high precision can be created.

[Scenario Execution Example by Physical Simulator 20]

Figure 2:
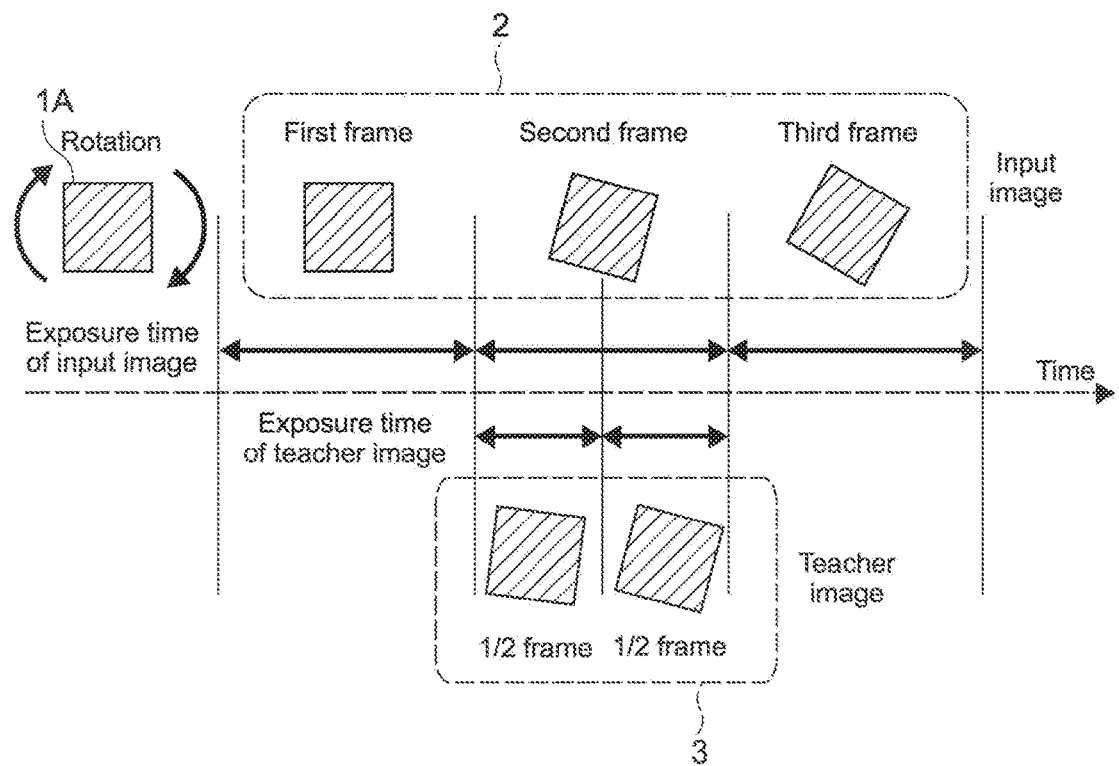
FIG. 2 describes creation of a learning information item by a physical simulator 20.

FIG. 2 is a drawing for describing creation of the learning information item by the physical simulator 20.

This example shows the case that the physical simulator 20 creates an input image 2 from successive three frames rotating at a constant speed for every frame period in accordance with the scenario for a supplied original image 1A, and creates an image at an intermediate rotation position between the first frame and the second frame and an image at an intermediate rotation position between the second frame and the third frame from the input image 2 as a successive image each at a double frame rate. The successive image at a double frame rate will be the teacher image 3.

The machine learning module 30 analyzes information about a motion vector between the frames and brightness information from the input image 2, and creates the image processing algorithm using the teacher image as a target.

As described above, in this embodiment, the physical simulator 20 creates the enormous kinds of comprehensive learning information items in accordance with the scenario described with the program code by the high-level language, and the machine learning module 30 executes the machine learning on the basis of the learning information items to compose the image processing algorithm. Accordingly, the image processing algorithm having a higher quality can be created.

Second Embodiment

According to a design device of an image processing algorithm in this embodiment, various kinds functions are built-in by a plug-in into a base of the machine learning algorithm of the machine learning module 30, which enables customizing the machine learning algorithm.

Figure 3:
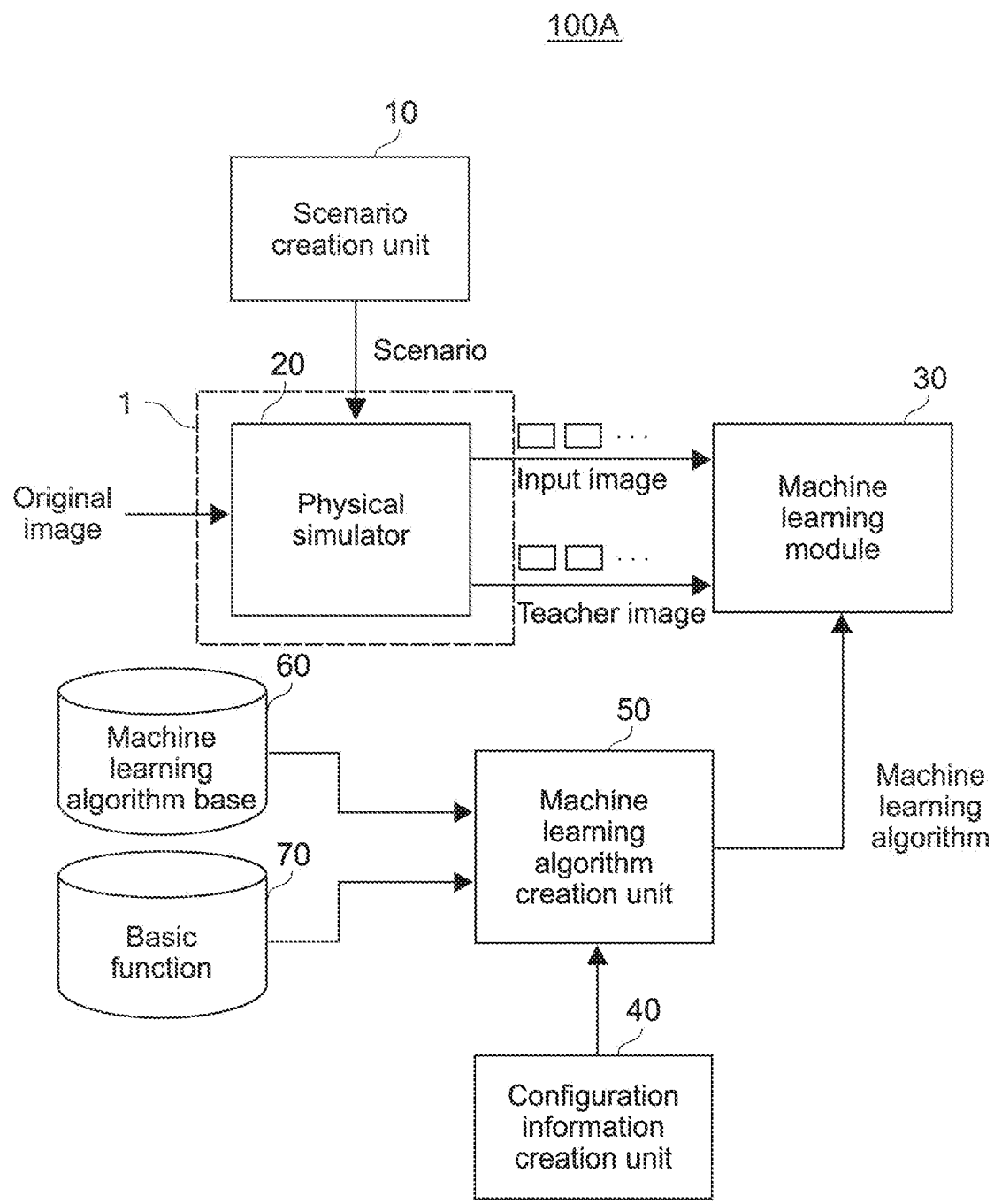
FIG. 3 is a block diagram showing a configuration of a design device of an image processing algorithm in a second embodiment according to the present technology.

FIG. 3 is a block diagram showing a configuration of a design device 100A of the image processing algorithm in a second embodiment according to the present technology.

The design device 100A of the image processing algorithm further includes a configuration information creation unit 40, a machine learning algorithm creation unit 50, a machine learning algorithm base storing unit 60 and a function storing unit 70 in addition to the configuration of the design device 100 of the image processing algorithm in the first embodiment. The configuration information creation unit 40 and the machine learning algorithm creation unit 50 may be configured of the control unit 1 such as the CPU together with the physical simulator 20 and the machine learning module 30.

The machine learning algorithm base storing unit 60 stores the base of the machine learning algorithm that is a minimum required algorithm for performing the machine learning.

The function storing unit 70 saves various basic functions for determining the machine learning algorithm by building in into the base of the machine learning algorithm by the plug-in. The basic functions will be described later in detail.

The machine learning algorithm base storing unit 60 and the function storing unit 70 are specifically configured of storage devices that can store information.

The configuration information creation unit 40 supports a work that configuration information of the machine learning algorithm is created by the configuration information creator. The creation work of the configuration information by the configuration information creator is done by using an information processing apparatus such as a PC, for example. Information specifying one or more basic functions that are designated so as to be built in by the plug-in into the base of the machine learning algorithm is described into the configuration information.

The machine learning algorithm creation unit 50 creates the machine learning algorithm by building in one or more basic functions into the base of the machine learning algorithm on the basis of the configuration information as the plug-in. The created machine learning algorithm is introduced into the machine learning module 30. In this manner, the machine learning module 30 that composes the image processing algorithm in accordance with the machine learning algorithm is acquired.

[About Basic Function]

Next, the basic functions below will be described.
Dimension reduction function
Self-organization function
Composite type function
Recursive type function
Empirical rule accumulation type function
Factorization type function
Polynomial type function
Orthogonal control type function
etc.

Note that the machine learning module 30 is configured of a hierarchical neural network.

The hierarchical neural network is configured, for example, of three layers: an input layer, an intermediate layer, and an output layer. Each layer is configured of a plurality of units that correspond to respective neurons. The plurality of units of each layer are connected to outputs of the respective units in an upstream layer, and connected to input of the respective units in a downstream layer. To respective intermediate units in the intermediate layer, a value to which a coupling load is added to each input value is added. The output from each output unit in the output layer is compared to teacher data. Until the difference becomes lower than a predetermined threshold value, i.e., until the machine learning is converged, the value of the coupling load is updated. Then, a set of the load values added to each unit when the machine learning is converged is acquired as a machine learning result. Thus, in the hierarchical neural network, the target image processing algorithm is composed.

(Dimension Reduction Function)

If an information amount added to the machine learning module 30 is excess, a computation amount of the machine learning becomes enormous, and an enormous time may be taken to converge the machine learning. Therefore, the information input to the machine learning module 30 may be compressed to the extent that deterioration of the image is suppressed as minimum as possible.

Figure 4:
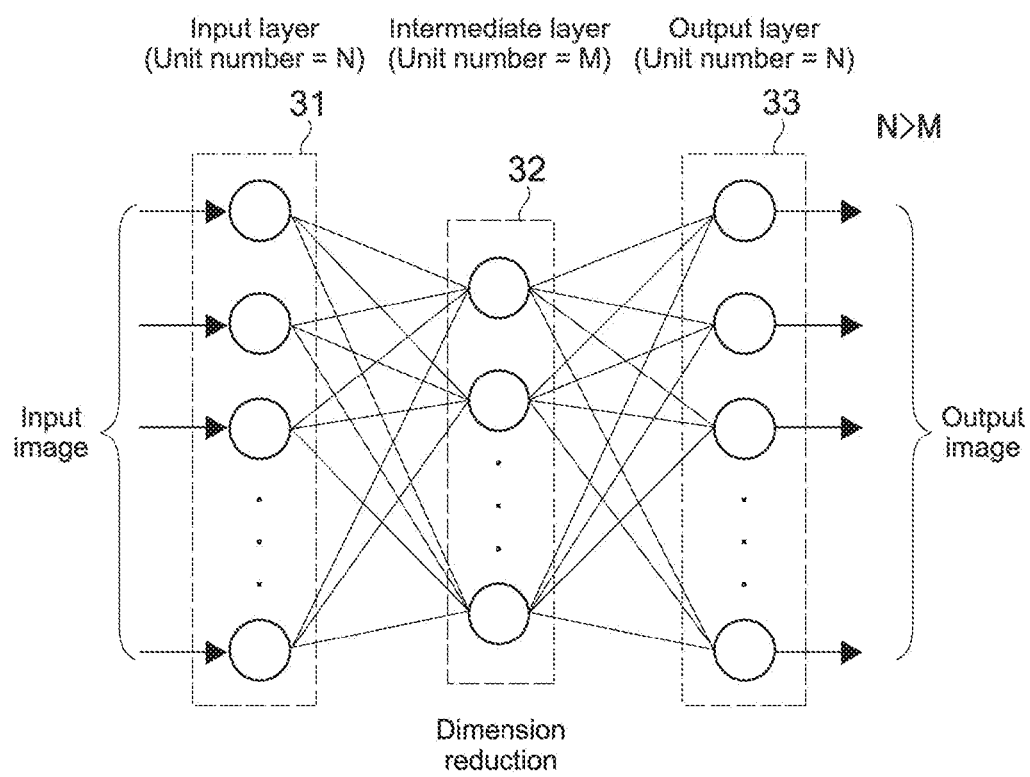
FIG. 4 is a diagram showing a configuration of a dimension reduction function.

FIG. 4 is a diagram showing a configuration of a dimension reduction function.

The dimension reduction function is fulfilled by setting a unit number (M) of the intermediate layer 32 lower than a unit number (N) of the input layer 31, and setting a unit number of the output layer 33 to the same as the unit number (N) of the input layer in the hierarchical neural network. In other words, data is dimension-reduced at the intermediate layer 32, and the data is returned to have the same information amount as the input data at the output layer 33. In this manner, an overall computation amount of the machine learning can be decreased, and the algorithm can be composed at a high speed.

(Self-Organization Function)

Figure 5:
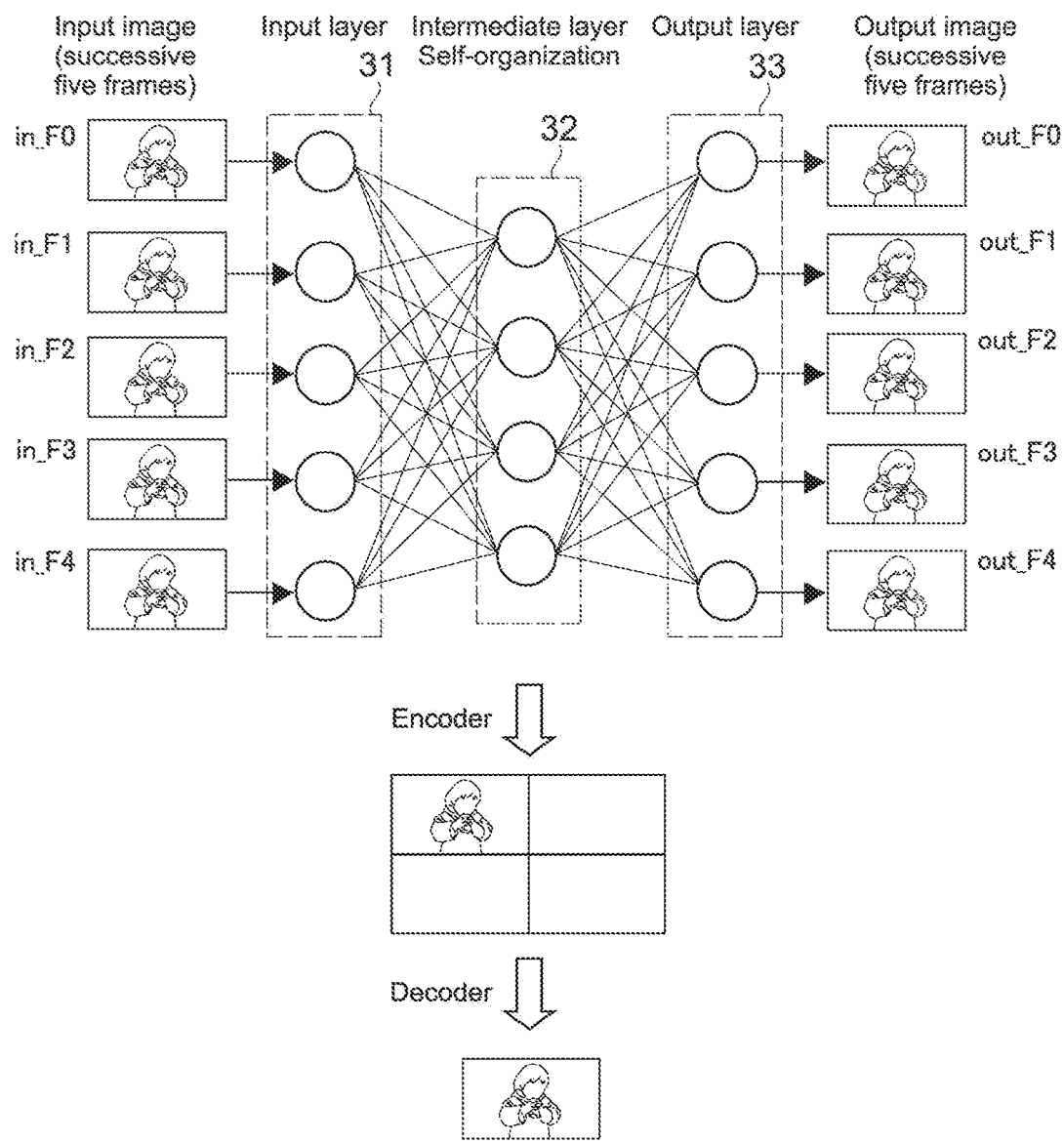
FIG. 5 is a diagram showing an example of a self-organization function.

FIG. 5 is a drawing showing an example of a self-organization function.

The self-organization is a phenomenon that the information of the data is autonomously decomposed for every neuron of the intermediate layer 32 by learning the coupling at the intermediate layer 32 so that the input data added to the input layer 31 is the same as the output data output from the output layer 33 in the hierarchical neural network, for example.

In the example of the self-organization function, to N input units in the input layer 31, for example, successive five frames in_F0-in_F4 are added per one frame. The machine learning for updating the coupling load of each intermediate unit in the intermediate layer 32 is done so that five frames out_F0-out_F4 output from N output units in the output layer 33 equal to frames in_F0-in_F4 added to each corresponding input unit. In this manner, redundant information is scraped off, and self-organization occurs so as to gather the same information on each intermediate unit of the intermediate layer 32, thereby decomposing the information of the data into four quadrants: a center image, back and forth movement, vector information, and movement resolution information. That is to say, an encoder and decoder algorithm about the Wavelet conversion in a time direction is composed.

(Combination of Dimension Reduction Function and Self-Organization Function)

When an algorithm for high-frame rating an image is created, the algorithm should be designed taking into consideration that the image has three dimensions: spaces X-Y and time T and that the movement ranges over a wide frequency area. In order to compose the algorithm by the machine learning, it is conceivable that the machine learning is done for every area dividing by the whole frequency area. However, the method results in an enormous learning amount. In addition, the same data may be input overlapped in the machine learning over a plurality of frequency areas. If the input data is redundant, accuracy of the machine learning may be lowered. Furthermore, in the three dimensional image processed by the algorithm created, especially in an image having a movement of a frequency around a boundary between areas, the machine learning is done separately for every area, which may disable a seamless connection.

To address the issue, it is effective to dimension-reduce the input data, and the self-organization is then performed.

Figure 6:
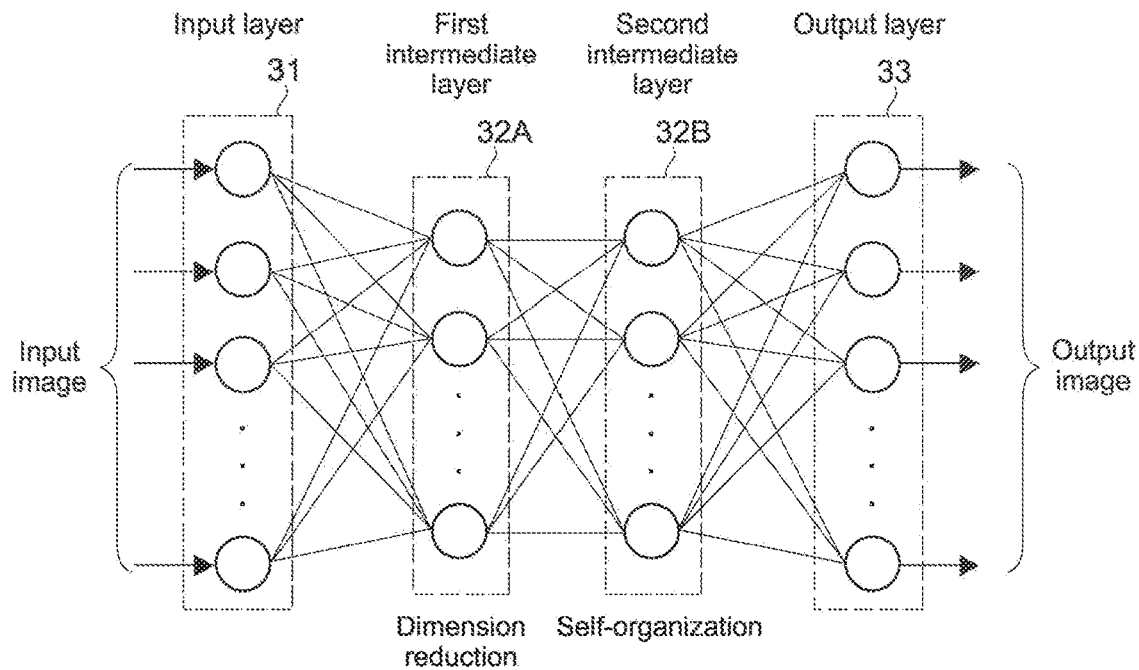
FIG. 6 is a diagram showing a configuration example of a combination type function of dimension reduction and self-organization.

FIG. 6 is a drawing showing a configuration example of a combination type function where the input data is dimension-reduced, and the self-organization is then performed.

In the hierarchical neural network, a first intermediate layer 32A for dimension reduction is disposed at a downstream side of the input layer 31, and a second intermediate layer 32B for self-organization is disposed between the first intermediate layer 32A and the output layer 33.

In the hierarchical neural network, by the dimension reduction at the first intermediate layer 32A, redundant input data overlapped in the machine learning over a plurality of frequency areas is collected. Then, by the self-organization at the second intermediate layer 32B, the information necessary for creating the algorithm is decomposed. In this manner, a composition accuracy of the algorithm can be improved.

Here, a reason why the composition accuracy of the algorithm is improved by the above-described mechanism will be described.

Figure 7:
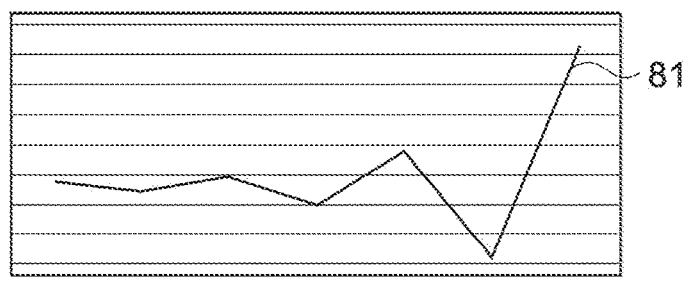
FIG. 7 is a diagram showing an example of a typical machine learning.
Figure 7:
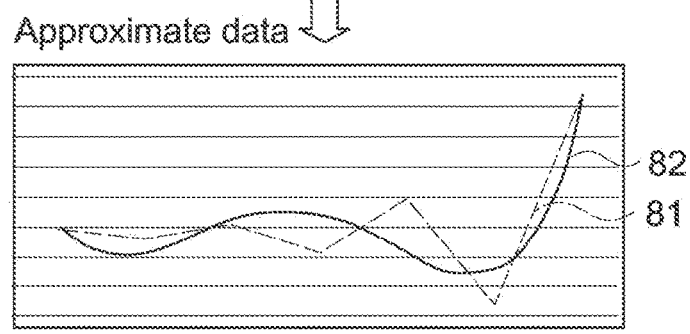

In essence, the machine learning is merely the least squares method. However, by the least squares method, an approximate equation with a high accuracy cannot be acquired depending on data, for example, as shown in FIG. 7. 81 in FIG. 7 is an example of input data ($F(x)=f(x)*g(x)$) that is a target approximation. The input data $F(x)$ is a product of analog data $f(x)$ and discrete data $g(x)$. The input data 81 is approximated by the least squares method, which results in approximation data 82. Thus, in this example, a sufficient frequency response is not acquired, which shows that the input data 81 is not approximated with a high precision. If the approximation precision is bad, the image developed in accordance with the approximate equation may have Bokeh or ghost.

Figure 8:
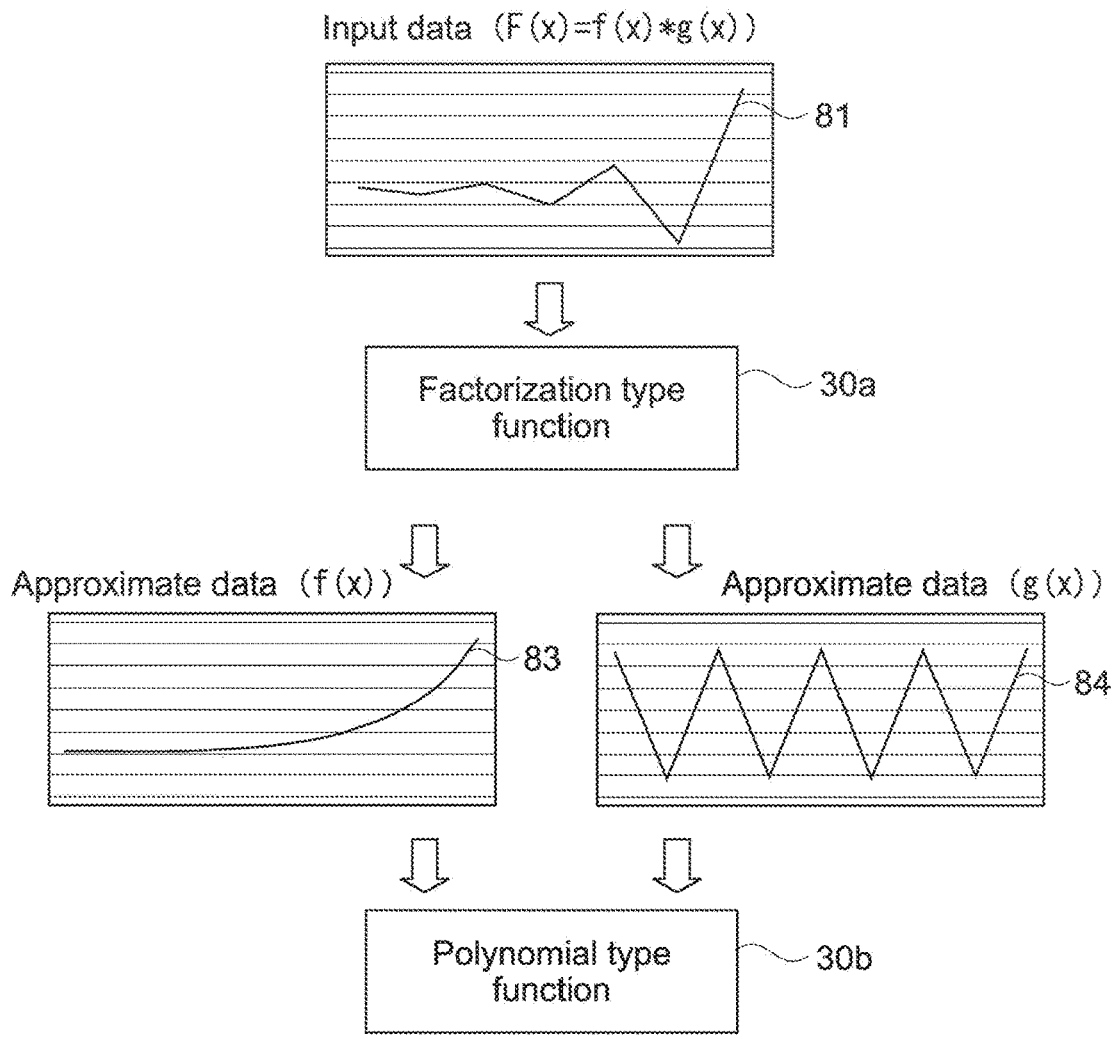
FIG. 8 is a diagram showing an example of the machine learning by the combination type function of dimension reduction and self-organization in FIG. 6.

In contrast, the self-organization by the machine learning where the input data is matched with the output data equals to factorization of the input data. FIG. 8 shows that two approximate data 83, 84 are factorized by the self-organization function 30a from the input data 81 shown in FIG. 7. Here, the approximate data 83 is approximate data of the analog data $f(x)$, and the approximate data 84 is approximate data of the discrete data $g(x)$. The factorized two approximate data 83, 84 are supplied to a polynomial type function 30b for composing the polynomial, thereby composing the polynomial $F(x)=f(x)*g(x)$.

(Composite Type Function)

Figure 9:
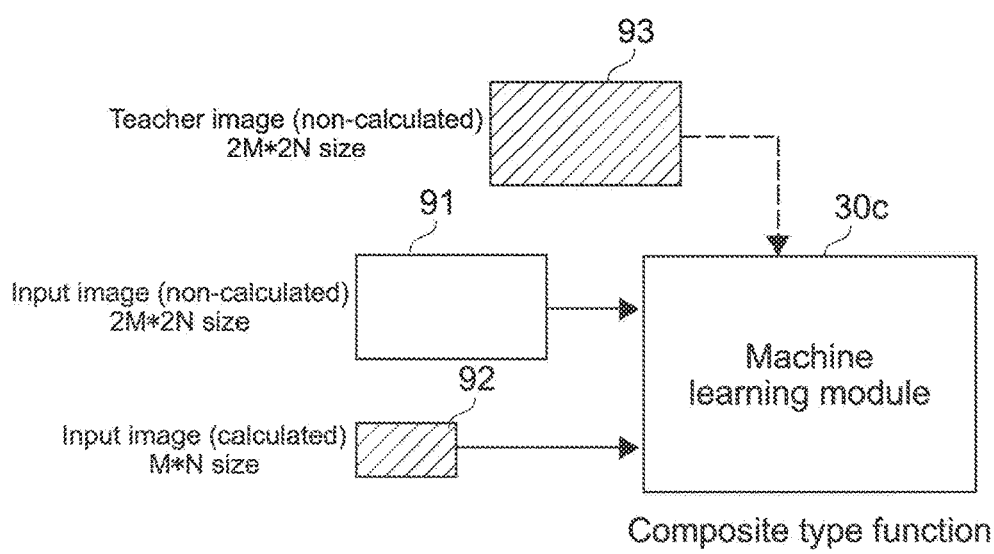
FIG. 9 is a diagram showing a configuration upon the machine learning by a composite type function.
Figure 10:
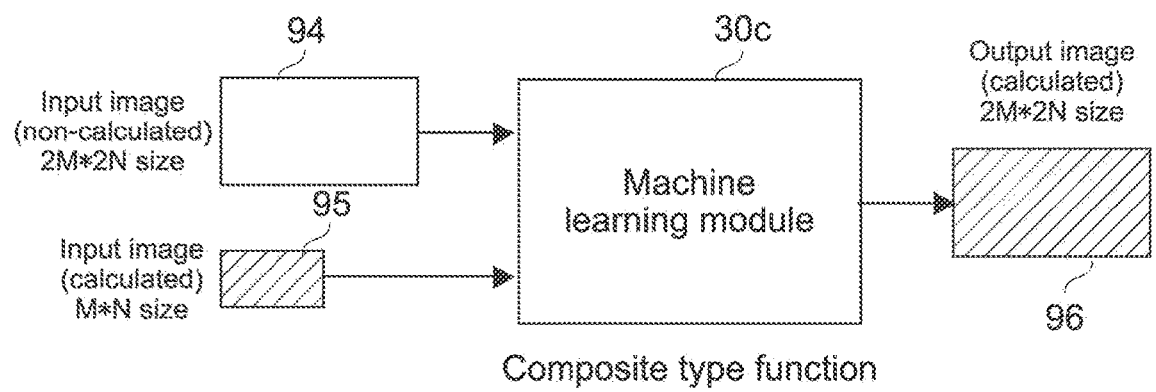
FIG. 10 is a diagram showing a configuration upon data processing by the composite type function.

FIG. 9 is a diagram showing a configuration upon the machine learning by the composite type function, and FIG. 10 is a diagram showing a configuration upon the data processing by the composite type function.

As shown in FIG. 9, to the machine learning module 30c where the composite type function is plugged in, a non-calculated image 91 in a 2M*2N size and an image 92 in a M*N size acquired by down-converting the non-calculated image 91 and computing for the image processing with an external processing apparatus are input. At this time, the machine learning module 30c performs the machine learning using an image 93 as an education image acquired by performing the same computation on the image 91 in a 2M*2N size by the external processing apparatus as the computation for the image processing performed on the image 92. In this manner, the algorithm for the image processing is composed within the machine learning module 30c.

The machine learning module 30c that ends the machine learning inputs an image 94 in a 2M*2N size as an image processing target and an image 95 in a M*N size acquired by down-converting the image 94 and computing for the image processing with an external processing apparatus, as shown in FIG. 10. As a result, the machine learning module 30c outputs an image 96 in a 2M*2N size that is image-processed by the algorithm composed by the machine learning.

Here, although examples of the image in the 2M*2N size and the image in the M*N size include a 4K high-vision image, a high-vision image, etc., for example, the present technology is not limited thereto.

In addition, the case here described is that the calculated image in the M*N size and the non-calculated image in the 2M*2N size are input into the composite type function. Alternatively, one of the respective images in hierarchies before and after the Wavelet conversion may be input into the composite type function as the calculated image, and the other may be input into the composite type function as the non-calculated image, whereby the non-calculated image may be image-processed by the composed algorithm.

(Recursive Type Function)

The recursive type function is a function to feed-back output data of the machine learning module into the input layer and to compute repeatedly and recursively. The recursive type function can be combined with the above-described composite type function in order to suppress the overall computation amount.

Figure 11:
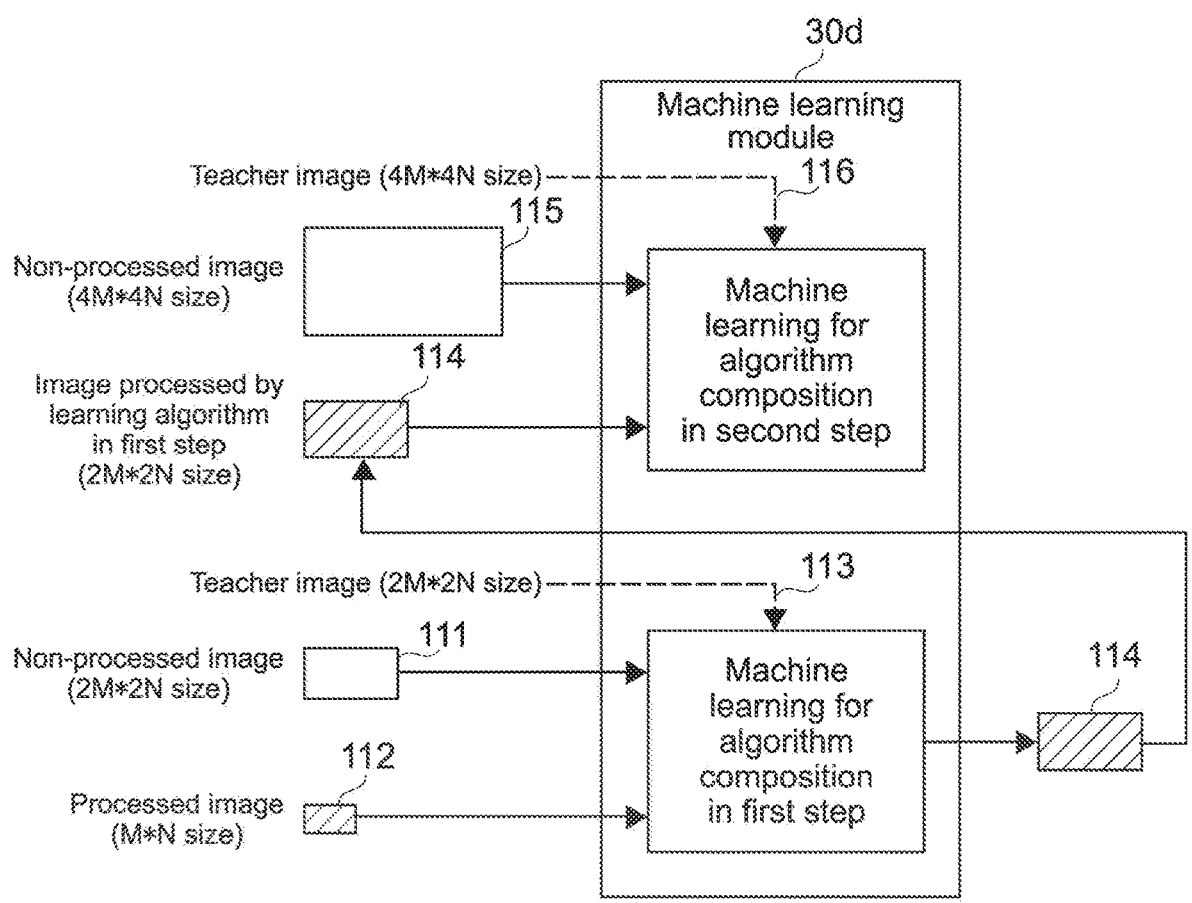
FIG. 11 is a diagram showing a configuration upon the machine learning by a machine learning module in a combination type of a recursive type function and a composite type function.

FIG. 11 is a drawing showing a configuration upon the machine learning by the machine learning module 30 in a combination type of the recursive type function and the composite type function.

To the machine learning module 30d, a non-processed image 111 in a 2M*2N size and an image 112 in a M*N size acquired by down-converting the non-calculated image 111 and computing for the image processing with an external processing apparatus are input. The machine learning module 30d performs the machine learning for composing the image processing algorithm in a first cycle using an image 113 as an education image acquired by performing the same image processing as the image 112 on the image 111 in a 2M*2N size by the external processing apparatus.

Next, a processed image 114 in a 2M*2N size acquired by the image processing algorithm in a first cycle during the machine learning is input to the input layer. When the processed image 114 is returned to the input layer of the machine learning module 30d, a non-processed image 115 in a 4M*4N size to be composed is input to the input layer. In addition, an image 116 acquired by performing the same image processing as the image 112 on the image 115 in a 4M*4N size by the external processing apparatus is supplied to the machine learning module 30d, and the machine learning for composing the image processing algorithm in a second cycle is performed.

In this manner, by combining the composite type function and the recursive type function, the algorithm for performing the image processing over a plurality of steps can be composed.

Figure 12:
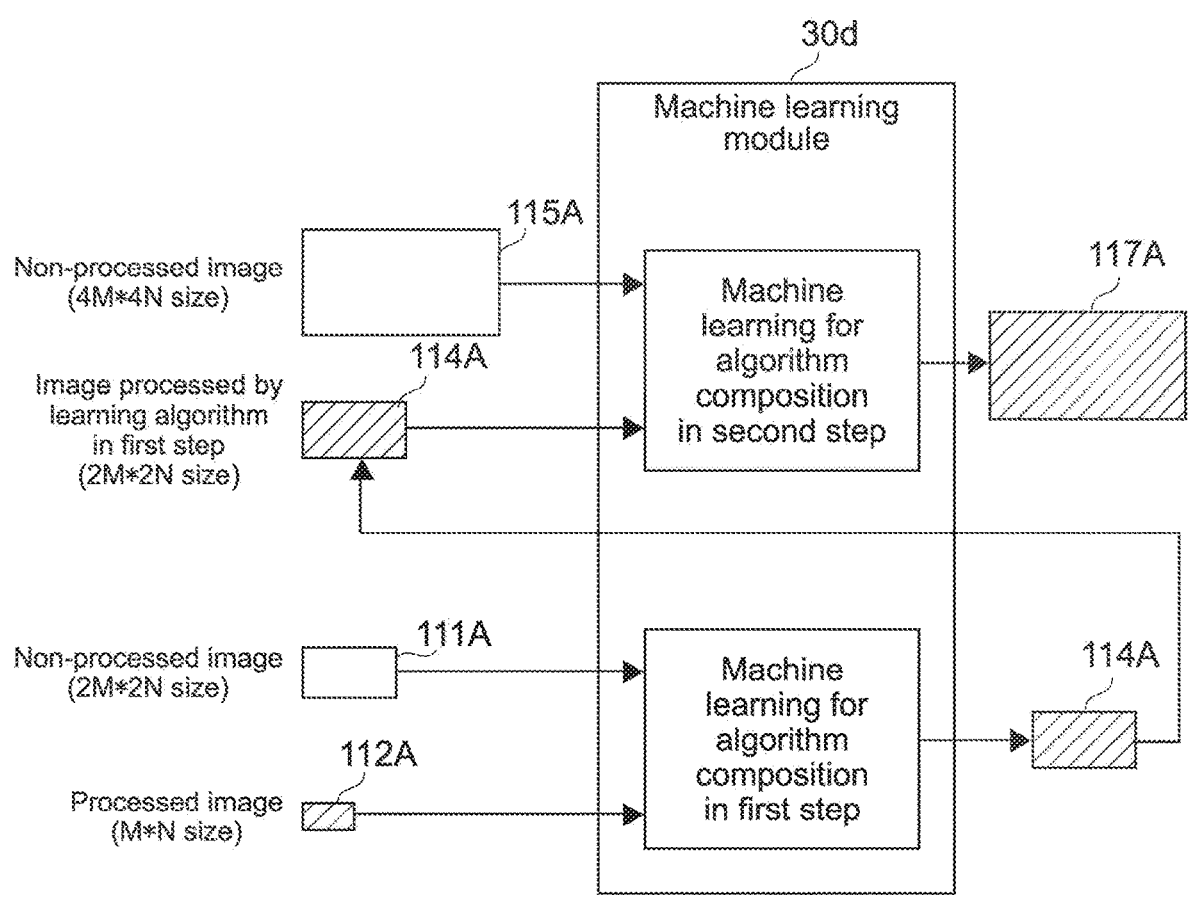
FIG. 12 is a diagram showing a configuration upon image processing by the machine learning module in a combination type of a recursive type function and a composite type function shown in FIG. 11.

FIG. 12 is a drawing showing a configuration upon the image processing by the machine learning module 30d in the combination type of the recursive type function and the composite type function shown in FIG. 11.

To the machine learning module 30d, a non-processed image 111A in a 2M*2N size to be composed and an image 112A in a M*N size acquired by down-converting the non-processed image 111A and computing for the image processing with an external processing apparatus are input. An image-processed image 114A in a 2M*2N size is output from the machine learning module 30 in accordance with the image processing algorithm in the first step composed by the machine learning. The image 114A is returned to the machine learning module 30. At this time, a non-processed image 115A in a 4M*4N size to be composed in a second step is input to the input layer of the machine learning module 30. Then, an image-processed image 117A in a 4M*4N size is output from the machine learning module 30 in accordance with the image processing algorithm in the second step composed by the machine learning.

(Empirical Rule Accumulation Type Function)

An algorithm composed by a machine learning module generally typified by a neural network is a mapping algorithm. Owing to general properties of the mapping, it is difficult to significantly increase output information to the input information. As a countermeasure when a sufficient information amount is not present in the original image for intended development, there is a method to dispose a database for accumulating a past empirical rule within the machine learning module, and to increase the information on the basis of the past empirical rule accumulated on the database.

Figure 13:
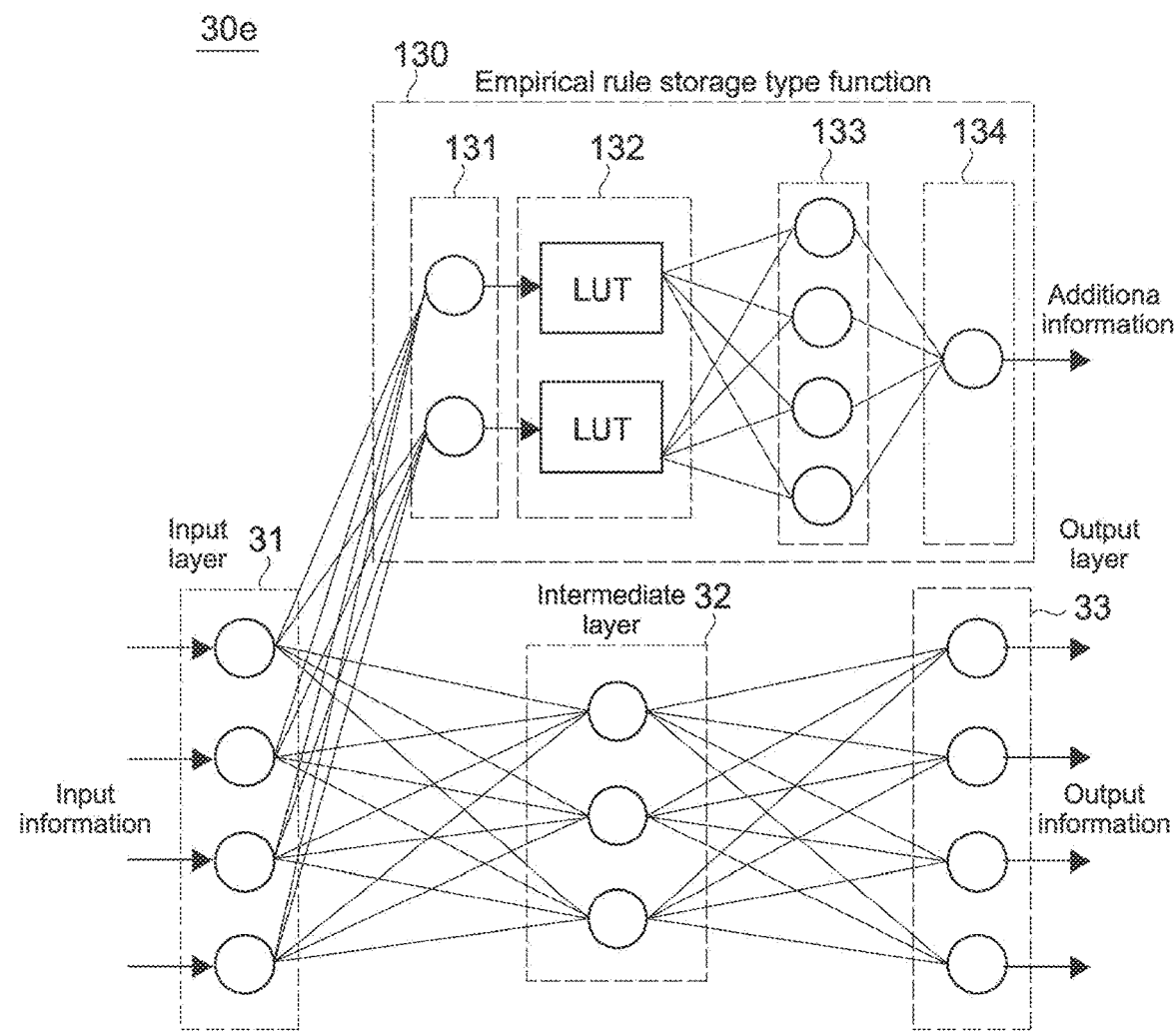

FIG. 13 is a drawing showing a configuration of a machine learning module 30e where an empirical rule accumulation type function 130 is plugged in.

The empirical rule accumulation type function 130 is constructed in a perceptron that is a part of the hierarchical type local area network. The empirical rule accumulation type function 130 includes an address creation unit 131, a lookup table (LUT) 132 as the database, an additional information creation unit 133, and an additional information output unit 134.

The address creation unit 131 creates an address showing a referent of the lookup table (LUT) 132 on the bases of a signal from an upstream layer such as the input layer 31.

The lookup table (LUT) 132 is a database where information on the basis of an empirical rule is accumulated.

The additional information creation unit 133 creates output information on the basis of reference information from the lookup table (LUT) 131.

The additional information output unit 134 outputs additional information created at the additional information creation unit 133 as information added to output information of the perceptron that composes the image processing algorithm of the hierarchical type local area network.

Figure 14:
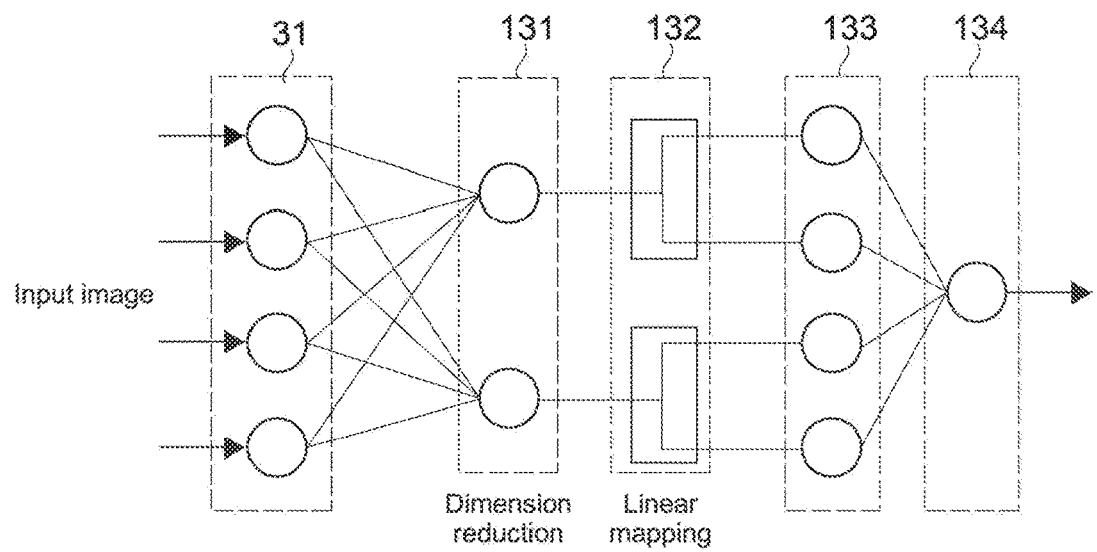
FIG. 14 is a diagram illustrating a method of accumulating information on the basis of an empirical rule.

Next, the method of accumulating the information on the lookup table (LUT) 132 that is the database on the basis of the empirical rule will be described using FIG. 14 and FIG. 15.

The information is accumulated on the lookup table (LUT) 132 by executing a program stored in the memory of the information processing apparatus such as a PC by the control device such as a CPU in the information processing apparatus.

Firstly, the control device writes a value equivalent to a value input to each input unit of the input layer 31 of the hierarchical neural network into each unit of the additional information creation unit 133. Next, the control device executes the machine learning by back-propagation. This allow the algorithm where the lookup table (LUT) 132 does not relate to learning to be composed.

Figure 15:
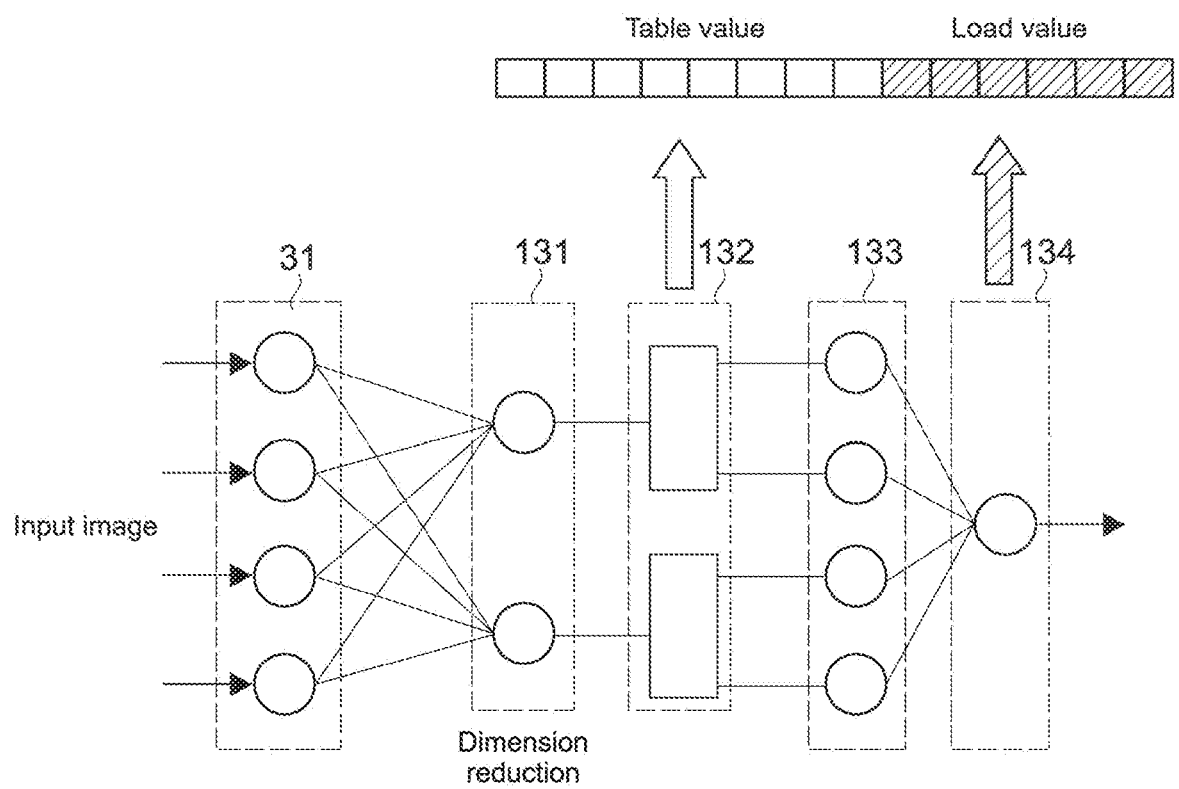
FIG. 15 is also a diagram illustrating a method of accumulating information on the basis of an empirical rule.

Next, the control device selects an address value of the lookup table (LUT) 132 and a load value of neurons in the additional information output unit 134, and execute the machine learning by a genetic algorithm taking an arrangement of the address value and the load value as a gene arrangement, as shown in FIG. 15. The genetic algorithm is a learning algorithm that imitates industrially a process that organisms evolves adjusting themselves to environments.

In the machine learning by the genetic algorithm, the control device evaluates a plurality of computation results acquired by probabilistically varying parameters, and determines the patterns that have the best two results. Then, the control device repeats the same processing on the two patterns through a genetic information crossover and a mutation process. This allows the empirical data to be accumulated on the lookup table (LUT) 132.

(Factorization Type Function)

As shown in FIG. 8, the factorization type function 30a is a function that when the algorithm to be composed by the machine learning is represented by a polynomial such as $F(x)=f(x)*g(x)$, each item $f(x)$, $g(x)$ of the elements in the polynomial is factorized. The factorization type function is configured, for example, of a self-organization function, or a combination of a dimension reduction function and a self-organization function.

(Polynomial Type Function)

As shown in FIG. 8, the polynomial type function 30*b* is a function to integrate the factorized information by the former factorization type function 30*a*, and to compose the polynomial algorithm by the machine learning taking the expected value as education data.

(Orthogonal Control Type Function)

Figure 16:
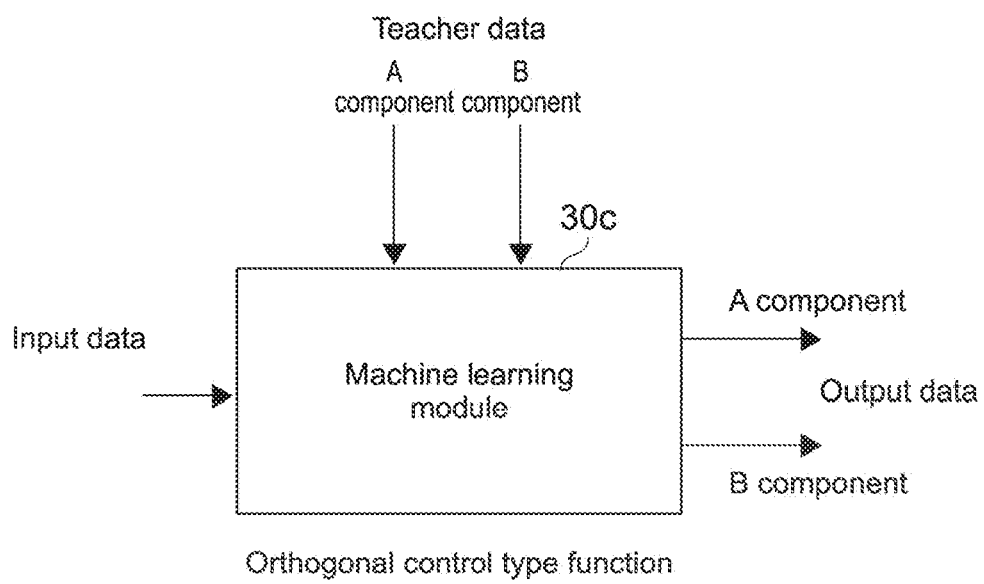
FIG. 16 is a diagram showing a configuration of an orthogonal control type function.

The orthogonal control type function can correct variations of the information amount generated within components dimensionally extended, when certain information is dimensionally extended. More specifically, as shown in FIG. 16, the orthogonal control type function orthogonally decomposes the input information into two components (A component, B component) on the basis of the teacher data of the respective components (A component, B component), and balances by up-conversion processing and down-conversion processing.

For example, when image information is high-frame rated, the information is dimensionally extended in a time direction. At this time, when the original image includes a shutter, a captured time and a non-captured section are present. When a captured phase of the captured section is set to 0 degree, the information amounts are different around 0 degree and ±180 degrees. When it is dimensionally extended in a time direction with the input image, an image quality is varied per time phase. In particular, harmony is deteriorated and S/N is deteriorated in the shutter section.

Figure 17:
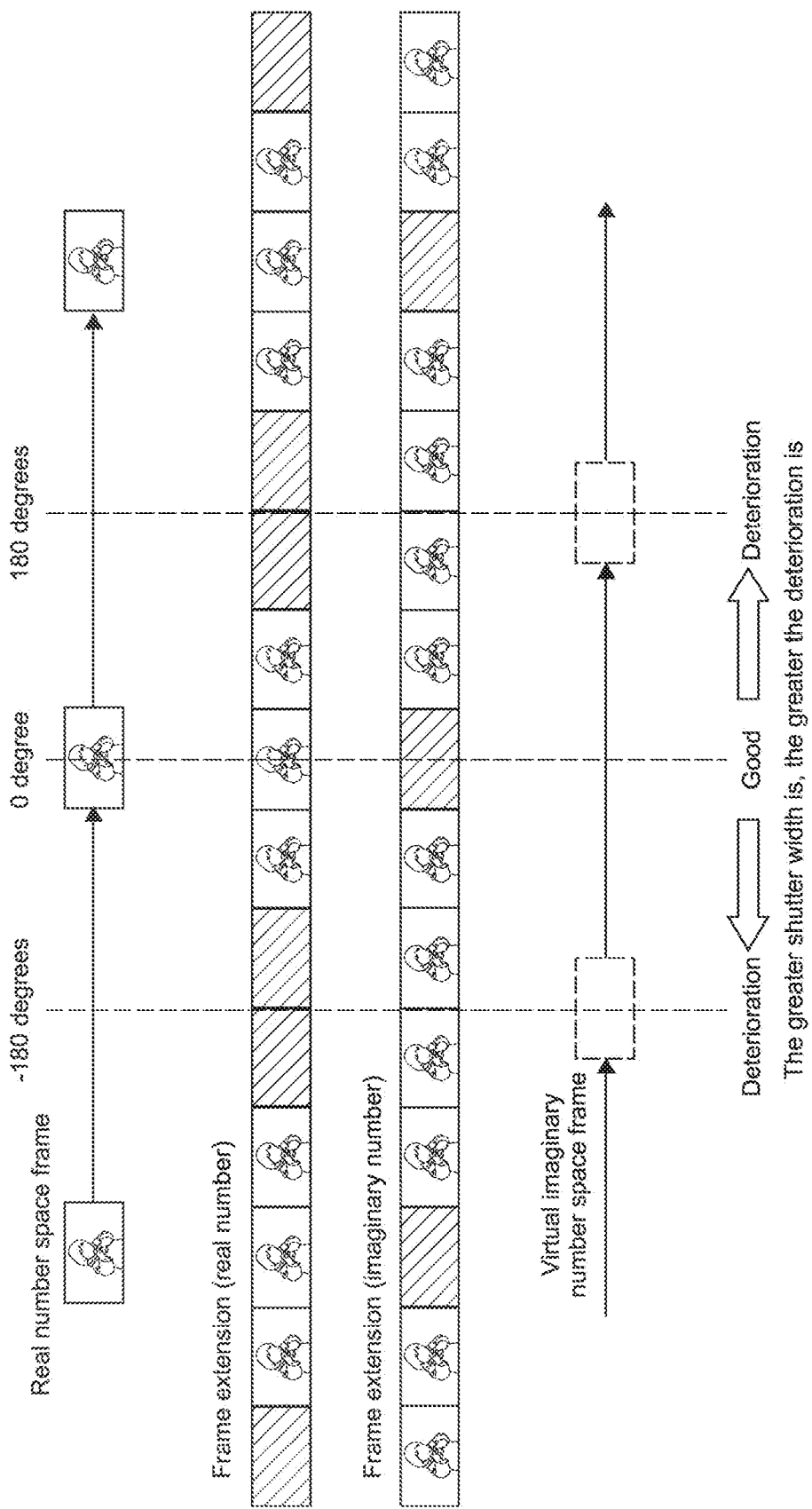
FIG. 17 is a diagram showing a concrete example of the orthogonal control type function.

In order to solve the problem, the orthogonal control type function, for example, orthogonally decomposes the image information into a real number component mainly including a phase of 0 degree and an imaginary number component mainly including a phase of ±180 degrees, and balances the images between phases by down-conversion processing of the real number component and up-conversion processing of the imaginary number component, as shown in FIG. 17.

Third Embodiment

Figure 18:
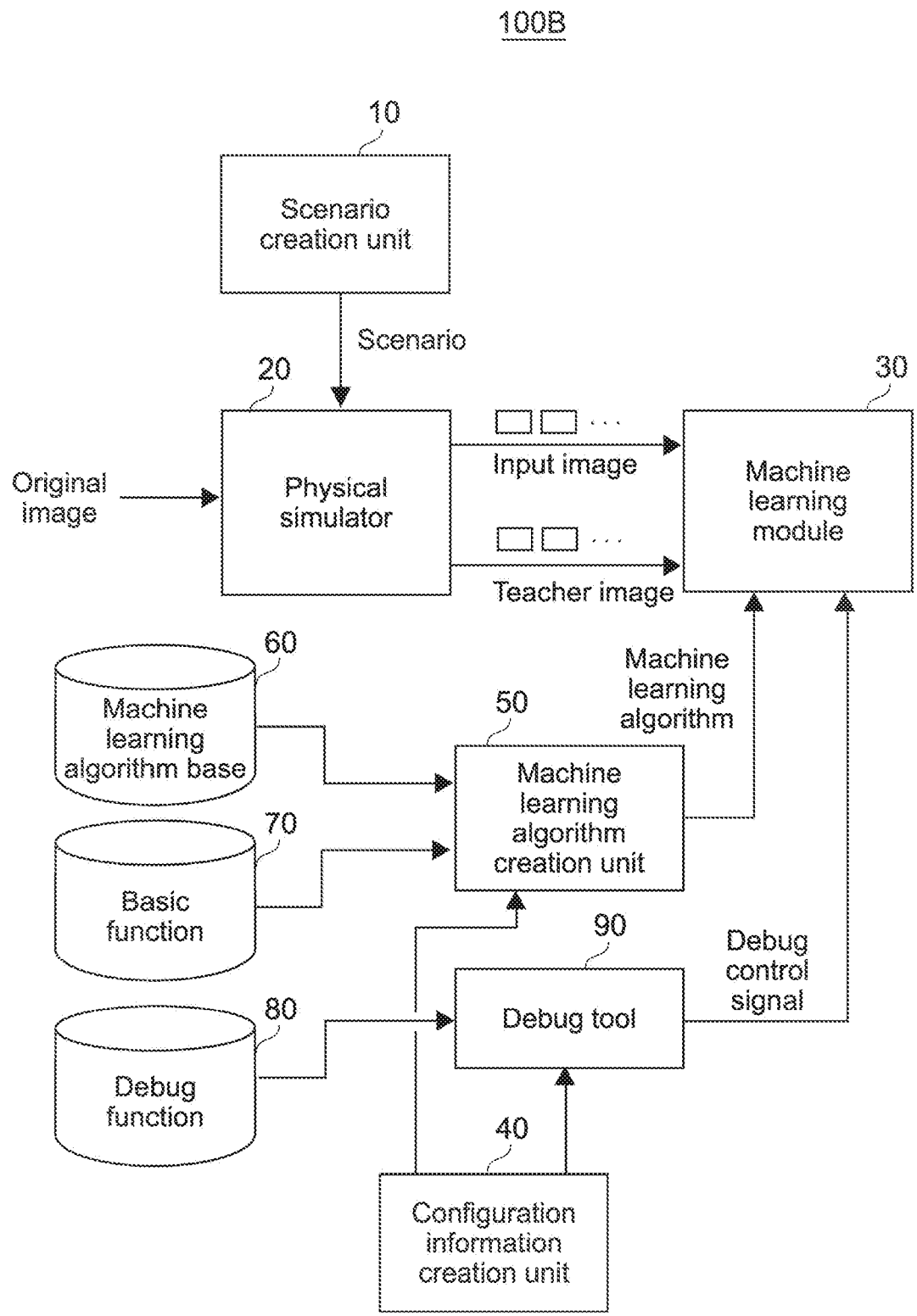
FIG. 18 is a block diagram showing a configuration of a design device of an image processing algorithm in a third embodiment according to the present technology.

FIG. 18 is a block diagram showing a configuration of a design device of an image processing algorithm in a third embodiment according to the present technology.

A design device 100B of the image processing algorithm is further includes a debug tool 90 in addition to the configuration of the design device 100A of the image processing algorithm in the second embodiment.

The debug tool 90 reads instance (program code) of the debug function from a debug function preserving unit 80 on the basis of the information that designates the debug function described in the configuration information. The debug tool 90 includes a debug algorithm base, and can build-in the debug function as the plug-in.

In order to be capable of debugging the image processing algorithm composed by the machine learning module 30, the debug tool 90 supplies a control signal to the machine learning module 30 at a stage of the algorithm composition by the machine learning by which the machine learning module 30 composes the algorithm whose behavior is changed depending on the control signal.

Next, the debug function will be described.
The debug function includes, for example,
Analog flow control function,
Digital flow control function, etc.
(Analog Flow Control Function)

If the algorithm composed by the machine learning, e.g., a developing algorithm, is not as expected, various image parameters such as brightness and gradation may be problematically fluctuated in level. In order to allow debug analysis of the problem, the analog flow control function supplies an analog control signal to the machine learning module 30 from the debug tool 90 at a stage of the algorithm composition by the machine learning by which the machine learning module composes the algorithm whose behavior is changed depending on the analog control signal. When the composed algorithm is debugged, a variety of analog control signals are supplied from the debug tool 90 to the machine learning module 30. At this time, the result output from the machine learning module 30 can be used as the information for the debug analysis.

Figure 19:
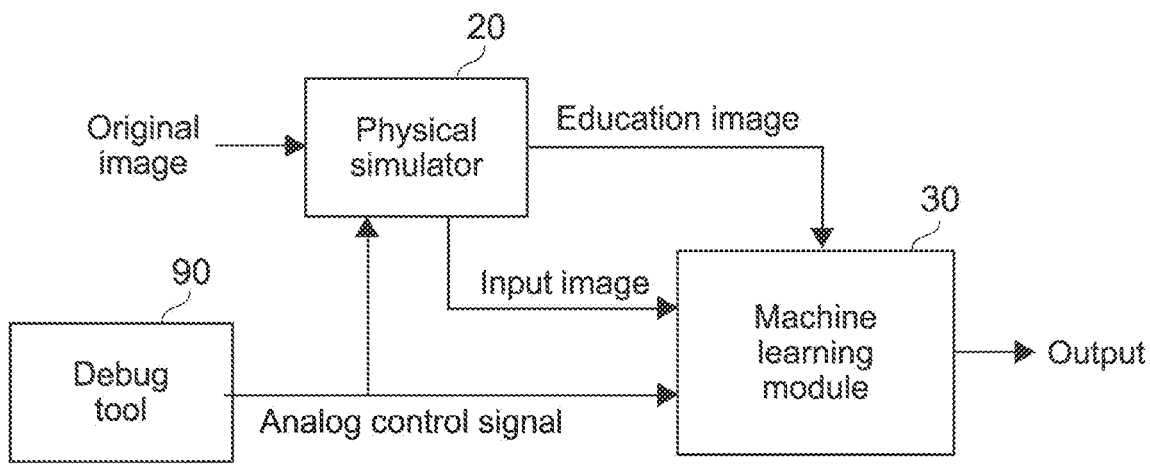
FIG. 19 is a diagram showing a configuration of an analog flow control function.

FIG. 19 is a drawing showing a configuration of an analog flow control function.

Upon the machine learning, the debug tool 90 supplies the analog control signal to the physical simulator 20 and the machine learning module 30. The physical simulator 20 changes the teacher image depending on the supplied analog control signal, and supplies it to the machine learning module 30. On the basis of the input image and the teacher image supplied from the physical simulator 20, and the analog control signal supplied from the debug tool 90, the machine learning module 30 composes the image processing algorithm whose behavior is changed depending on the analog control signal by the machine learning.

Upon debugging, the analog control signal is supplied from the debug tool 90 to the machine learning module 30. At this time, the behavior of the image processing algorithm composed by the machine learning module 30 is verified, for example, by an external information processing apparatus, thereby debugging the image processing algorithm.

(Digital Flow Control Function)

The digital flow control function is a function to execute separately the machine learning by the machine learning module 30 depending on the conditions.

Figure 20:
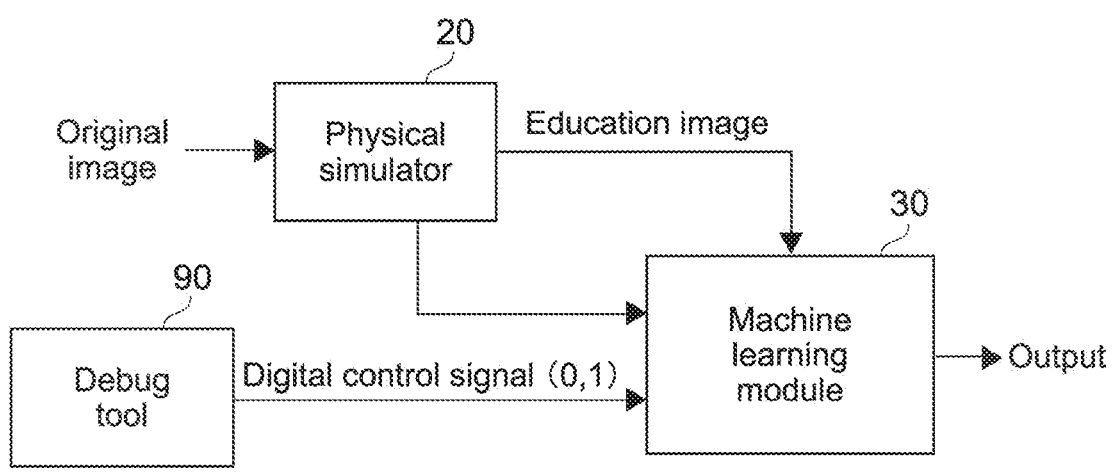
FIG. 20 is a diagram showing a configuration of digital flow control function.

FIG. 20 is diagram showing a configuration of digital flow control function.

Upon the machine learning, the debug tool 90 creates, for example, a binary (0, 1) digital control signal for controlling the behavior of the machine learning module 30, and supplies it to the machine learning module 30. The machine learning module 30 executes separately the machine learning on the input image and the teacher image supplied from the physical simulator 20 per digital control signal value. For example, the machine learning module 30 machine-learns "mapping 0" when the digital control signal value is "0", and machine-learns "mapping1" when the digital control signal value is "1". In this manner, the image processing algorithm whose behavior is changed depending on the digital control signal value can be composed.

Upon debudding, the digital control signal is supplied from the debug tool 90 to the machine learning module 30. At this time, the behavior of the image processing algorithm composed by the machine learning module 30 is verified, for example, by an external information processing apparatus, thereby debugging the image processing algorithm.

Alternative Embodiment 1

(Extension Function)

The extension function is a function to plug-in by user definition. As the machine learning module 30 proceeds learning by the least squares method, a certain type of factorization processing is not suitable. In some cases when a part of items is taken out from the image information in advance, and the algorithm is separately composed, the composition accuracy of the algorithm is improved.

In the image processing, it is effective to extract decomposition information where necessary elements are extracted in advance. By the extracted information, the machine learning module 30 understands deeply as an object, thereby improving the algorithm accuracy.

The present technology may also have the following configurations.

(1) An information processing apparatus, including a control unit that creates a plurality of learning information items including an input image and a teacher image as an expected value by image-processing the input image in accordance with a scenario described with a program code, and supplies the created plurality of learning information items to a machine learning module that composes an image processing algorithm by machine learning.

(2) The information processing apparatus according to (1) above, in which
the control unit is configured to select a basic function that determines a machine learning algorithm of the machine learning module in accordance with configuration information created in advance.

(3) The information processing apparatus according to any one of (1) to (2) above, in which
the control unit is configured to supply a debug control signal that changes a behavior of the image processing algorithm to the machine learning module during the machine learning as input data.

(4) The information processing apparatus according to (3) above, in which
the control unit is configured to select the debug function in accordance with the configuration.

REFERENCE SIGNS LIST 1 control unit
10 scenario creation unit
20 physical simulator
30 machine learning module
40 configuration information creation unit
50 machine learning algorithm creation unit
60 machine learning algorithm base storing unit
70 function storing unit
80 debug function preserving unit
100, 100A, 100B design device of image processing algorithm

The invention claimed is:

1. An information processing apparatus, comprising:
at least one processor configured to:
generate a plurality of learning information items for an original image, wherein
each learning information item of the plurality of learning information items includes an input image and a teacher image,
a frame rate of the teacher image is double a frame rate of the input image,
the teacher image corresponds to an expected value, based on an image-processing operation on the input image,
the image-processing operation is based on a scenario associated with the original image, and
a first learning information item of the plurality of learning information items is different from a second learning information item of the plurality of learning information items based on the scenario; and
supply the plurality of learning information items to a machine learning processor, wherein the machine learning processor generates an image processing algorithm based on a machine learning process of the plurality of learning information items.

2. The information processing apparatus according to claim 1, wherein
the at least one processor is further configured to select a basic function to generate a machine learning algorithm for the machine learning processor, and
the basic function is selected based on configuration information.

3. The information processing apparatus according to claim 2, wherein
the at least one processor is further configured to supply a debug control signal to the machine learning processor based on the machine learning process, and
the debug control signal is supplied as input data and changes a behavior of the image processing algorithm.

4. The information processing apparatus according to claim 3, wherein the at least one processor is further configured to select a debug function based on the configuration information.

5. An information processing method, comprising:
in an information processing apparatus:
generating, by at least one processor of the information processing apparatus, a plurality of learning information items for an original image, wherein
each learning information item of the plurality of learning information items includes an input image and a teacher image,
a frame rate of the teacher image is double a frame rate of the input image,
the teacher image corresponds to an expected value, based on an image-processing operation on the input image,
the image-processing operation is based on a scenario associated with the original image, and
a first learning information item of the plurality of learning information items is different from a second learning information item of the plurality of learning information items based on the scenario; and
supplying, by the at least one processor, the plurality of learning information items to a machine learning processor, wherein the machine learning processor generates an image processing algorithm based on a machine learning process of the plurality of learning information items.

6. A non-transitory computer-readable medium having stored thereon computer-executable instructions, which when executed by an information processing device, cause the information processing device to execute operations, the operations comprising:
generating a plurality of learning information items for an original image, wherein
each learning information item of the plurality of learning information items includes an input image and a teacher image,
a frame rate of the teacher image is double a frame rate of the input image,
the teacher image corresponds to an expected value, based on an image-processing operation on the input image,
the image-processing operation is based on a scenario associated with the original image, and
a first learning information item of the plurality of learning information items is different from a second learning information item of the plurality of learning information items based on the scenario; and supplying the plurality of learning information items to a machine learning processor, wherein the machine learning processor generates an image processing algorithm based on a machine learning process of the plurality of learning information items.

* * * * *